United States Patent [19]
Tani et al.

[11] Patent Number: 5,436,054
[45] Date of Patent: Jul. 25, 1995

[54] ELECTRET FILTER

[75] Inventors: Yatsuhiro Tani; Syoji Tokuda, both of Ootsu, Japan

[73] Assignee: Toyo Boseki Kabushiki Kaisha, Osaka, Japan

[21] Appl. No.: 325,598

[22] Filed: Oct. 19, 1994

[30] Foreign Application Priority Data

Oct. 20, 1993 [JP] Japan .................................. 5-262324
Oct. 28, 1993 [JP] Japan .................................. 5-270764

[51] Int. Cl.⁶ .............................................. B32B 3/10
[52] U.S. Cl. ........................................ 428/131; 55/528; 55/DIG. 39; 264/DIG. 48; 428/136; 428/255; 428/910; 96/99

[58] Field of Search ............... 428/131, 136, 247, 255, 428/910; 55/DIG. 39, 155, 528; 264/DIG. 47, DIG. 48

[56] References Cited

U.S. PATENT DOCUMENTS

| | | | |
|---|---|---|---|
| Re. 31,285 | 6/1983 | Turnhout et al. | 55/DIG. 39 |
| 5,112,677 | 5/1992 | Tani et al. | 55/DIG. 39 |
| 5,143,767 | 9/1992 | Matsuura et al. | 428/255 |
| 5,350,620 | 9/1994 | Sundet et al. | 55/DIG. 39 |

*Primary Examiner*—James J. Bell
*Attorney, Agent, or Firm*—Foley & Lardner

[57] ABSTRACT

An electret filter formed by laminating a plurality of network electret film-split fiber fleeces having a different mesh size. It exhibits a high collecting efficiency with a very small pressure loss and without any appreciable fiber dropping, or any channeling.

5 Claims, 1 Drawing Sheet

ELECTRET FILTER

FIELD OF THE INVENTION

This invention relates to a network electret film split fiber fleece and an electret filter for a gas or liquid which is formed by a laminate of such fleeces.

BACKGROUND OF THE INVENTION

There is known an electret filter formed from film-split fibers, or fibers obtained by splitting a film, as disclosed in Japanese Patent Publication No. 56-47299. This publication mentions the fibrillation of a film into small fibers, but does not contain any description as to the shape, or other specific details of the fibers. Moreover, it does not contain any statement concerning the meshes of any network fleece formed by film-split fibers, or the performance of any filter formed from such fleeces. The examples which it describes cannot necessarily be considered to show any electret filter having a high collecting efficiency with a small pressure loss.

SUMMARY OF THE INVENTION

Under these circumstances, it is an object of this invention to provide an electret filter which is bulky, .and free from any appreciable dropping of fibers, and has a high collecting efficiency with a small pressure loss.

This object is essentially attained by an electret filter which comprises a plurality of network electret film-split fiber fleeces having differently sized meshes formed by trunk and branch fibers.

Other features and advantages of this invention will become apparent from the following description and.. the accompanying drawing.

Figure 1:
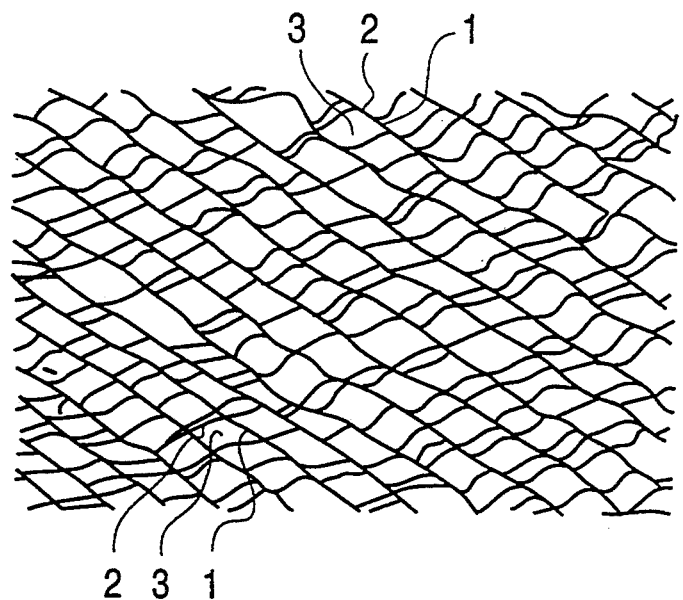
FIG. 1 is a view showing the meshes of a network electret film-split fiber fleece embodying this invention, as prepared from a photograph thereof taken through a stereomicroscope.

In the drawings, numeral 1 is trunk fiber, 2 is branch fiber, 3 is mesh, 4 is duct of testing equipment, 5 is sample holder, 6 is differential pressure gauge, 7 is particle counter, 8 is flowmeter, 9 is blower, 10 is HEPA filter, 11 is NaCl aqueous solution spray, 12 is dryer, 13 is concentration control box.

DETAILED DESCRIPTION OF THE INVENTION

A network electret film-split fiber fleece according to this invention is obtained by making fine regular or irregular longtudinally extending slits having a small length in the whole of a stretched electret film, and stretching the film transversely to an extent not exceeding 15 times its width, whereby the slits are widened to form a network structure. The network structure is formed by trunk fibers having a relatively large split width and branch fibers having a relatively small split width, as shown in FIG. 1, or by fibers having substantially the same split width. In either event, the fibers are interconnected, since the network is formed from a single film.

It is preferable that the trunk fibers have an average split width of 10 to 1000 microns, while the branch fibers have an average split width of 1 to 500 microns. If the trunk or branch fibers have a smaller split width, the network is easily broken and it is, therefore, difficult to obtain a uniform filter. If the fibers have a larger split width, the propagation of slits during the stretching of the film makes it difficult to obtain a uniform filter.

An electret filter according to this invention is obtained by laminating a plurality of network electret filmsplit fiber fleeces. The laminate, or filter has a packing density not exceeding 0.05 g/cc.

The meshes of the network are formed by the trunk and branch fibers. The size of a mesh is expressed by the square root of the product of the lengths of two sides a and b thereof (a×b) as shown .in FIG. 1, as is the case with the mesh size of a sieve used in the chemical industry. The mesh size is preferably from 1 to 50 mm, and more preferably from 3 to 30 mm. If it is smaller than 1 mm, or larger than 50 mm, a greater difference in performance and a greater degree of difficulty in stretching make it difficult to obtain a filter of high performance. Moreover, the lengths of the two sides a and b of the meshes preferably have a ratio (a:b) of 1:1 to 1:5. The mesh size depends on the kind and thickness of the film, the shape, number, thickness and arrangement of blades of a film splitter, and the degree or ratio to which the film is stretched. The film is preferably stretched at a ratio of 1:3 to 1:15, and more preferably at a ratio of 1:5 to 1:10, to achieve the mesh size and shape as defined above. If the ratio is less than 3, the film is not satisfactorily bulky, While it has a broken network if the ratio exceeds 15.

The fleece of this invention having a mesh size of 1 to 50 mm has its trunk and branch fibers kinked by stretching, and forming polarization surfaces which are more likely to lie substantially in parallel to the direction of flow of air through an air filter than in an ordinary air filter formed from split fibers. Thus, the fleece makes it possible to obtain an air filter which is bulky and highly permeable to gas, and exhibits a high collecting efficiency with a very small pressure loss and without having any appreciable dropping of fibers.

According to this invention, a filter of high performance is obtained by laminating a plurality of fleeces having different mesh sizes, rather than by employing fleeces having the same mesh size, since the split fibers of the former fleeces are more unlikely to overlap one another, while the meshes are more unlikely to be aligned with one another, so that any channeling is more unlikely to occur.

A filter of still higher performance can be obtained if the fleeces laminated and having different mesh sizes differ also in thickness, fiber width, or material. It is, for example, effective to laminate fleeces having different mesh sizes in the order of the mesh size, or to laminate alternately fleeces having a large mesh size and ones having a small mesh size. It is also effective to laminate fleeces which have different mesh sizes and differ also in thickness or fiber width, or both, so that they may form a gradient in bulk density or fiber denier.

The electret filter of this invention may consist of 2 to 10,000 fleeces, preferably 100 to 1000. It may have a unit weight of 1 $g/m^2$ to 10 $kg/m^2$, preferably 10 to 1000 $g/m^2$ and more preferably 20 to 500 $g/m^2$. It may have a packing density of 0.005 to 0.05 g/cc, preferably 0.01 to 0.03 g/cc, as measured at a pressure of 1.25 $g/cm^2$ by a compression modulus testing machine which may, for example, be supplied by Maeda Industrial Co., Ltd., Japan. This kind of machine is the only apparatus that can accurately measure the extremely low packing density of a highly bulky air filter.

The packing density of the filter according to this invention is very low as stated above. It is the level which has been difficult to obtain reliably from any ordinary split-fiber air filter, since it has been difficult to ensure its mechanical strength and prevent any dropping of split fibers. It has, on the contrary, been usual to raise the density of the filter by needle punching or thermal embossing. On the other hand, the electret filter of this invention is satisfactory in mechanical strength, bulky, and substantially free from any possibility of dropping of fibers, since the trunk and branch fibers in the fleeces having different mesh sizes and laminated to form the filter are joined to define the polarization surfaces which are very likely to lie substantially in parallel to the direction of flow of air through the filter.

The film used to form the fleece of this invention may be formed from any of a variety of materials having a high level of permanent chargeability with static electricity, including polyethylene, polypropylene, polystyrene, poly(4-methylpentene-1), poly(3-methylbutene-1), polyphenyl sulfide, polyether ether ketone, polyether sulfone, polyarylate, polyamideimide, polyetherimide, polyimide, polysulfone, polyacrylate, polybutylene terephthalate, polycarbonate, totally aromatic polyester, polytetrafluoroethylene, chlorotrifluoroethylene-ethylene copolymer, polyvinylidene fluoride, polyvinyl fluoride, polychlorotrifluoroethylene, tetrafluoroethylene-ethylene copolymer, tetrafluoroethylene-hexafluoropropylene copolymer, and tetrafluoroethylene-perfluoroalkylvinyl ether copolymer, and mixtures thereof.

It is possible to add various kinds of polymer additives to the film material to make an electret film which is improved in electrical charge decay and thermal resistance. The additives include fatty acid metal salts, organic nucleus agents and highly insulating high polymers. The film material preferably contains a total of 0.1 to 5% of additives.

The film is uniaxially stretched to be easily splittable. Its uniaxial stretching is performed as single- or multistage thermal stretching, and followed by heat setting, multistage thermal stretching is preferred to reduce any unevenness in thickness of the film across its width and improve its splittability.

A splitter comprising, for example, needle, flat or file blades is used for splitting the film in a regular or irregular pattern. The film splitter has a surface speed ratio (or fibrillation ratio) of 2 to 100, preferably 4 to 50, and more preferably 7 to 30, to the film speed. The film is split so as to have a slit density of preferably 5 to 10,000 slits, and more preferably 50 to 1000 slits, per square centimeter. No higher slit density is desirable, since an increase of broken branch fibers makes it impossible to maintain any proper network structure. No lower slit density is desirable, either, since no satisfactorily bulky fleece can be obtained by widening.

The film is converted to an electret before or after its uniaxial stretching, and before its splitting. Before splitting, the film has a very high charging efficiency by adhering closely to an earth electrode, while the split film adheres only very poorly to the earth electrode. The conversion of the film to an electret is carried out by, for example, corona charging which is effected by the corona discharge of an anode, or cathode, or the alternate of simultaneous corona discharge of the anode and cathode, charging in an electrical field at room or elevated temperature, or electron beam irradiation.

While it is possible to laminate the fleeces so that the polarization surfaces may be of a different sign, a laminate in which the polarization surfaces are of the same sign provides a more bulky electret filter of higher performance.

The fleeces forming an electret filter can be embossed, ultrasonically welded, or needle punched to improve its dimensional stability. It is also possible to attach a reinforcing material to the fleeces. The reinforcing material may, for example, be a spun bonded fabric, paper made by a wet or dry process, or other nonwoven fabric, a woven fabric, a net of a plastic material, metal, or other inorganic material, or filaments of a plastic material, metal, or other inorganic material. The reinforcing material may include a framework for the electret filter. Moreover, it may also have an adsorbing, mildewproof, aromatizing, or anti-microbial function.

The invention will now be described in further detail with reference to a variety of specific examples.

EXAMPLE 1

Two kinds of cast films having a different thickness of 25 and 50 microns, respectively, were prepared by the melt extrusion molding of a composition comprising isotactic polypropylene (TYB-450 of Mitsui Toatsu, Japan) and containing 0.5% of aluminum laurate and 0.2% of pentaerithrityltetrakis[3-(3,5-di-t-butyl-4-hydroxyphenyl)propionate]. Each film was uniaxially stretched to make a film having a thickness of 10 or 21 microns by a process comprising a first stage of stretching to twice as long at 120° C., a second stage of stretching to twice as long again at 140° C. and a third stage of stretching to 1.5 times as long at 155° C.

After two seconds of corona charging treatment had been given at an applied voltage of 24 kV to each uniaxially stretched film caused to travel in intimate contact with an earthing roller, it was split by a film splitter having four circular blades with a diameter of 50 mm and a pitch of 0.5 mm to form a network electret film-split fiber fleece and the fleece was wound on a bobbin. Each film having a thickness of 10 microns was split at a fibrillation ratio of 5, and each film having a thickness of 21 microns at a fibrillation ratio of 10. Each split film, or fleece had a slit density of 800 slits per square centimeter.

Two kinds of fleeces were rewound one upon the other about a bobbin, and cut transversely to form a laminate in which they-lay alternately. The laminate was transversely stretched, or widened to form a web having a unit weight of 150 g/m². A sample filter was cut out of the web by a Thomson's blade having a diameter of 75 mm. The fleece formed from the film having a thickness of 10 microns had a mesh size of 4 mm, and the fleece formed from the film having a thickness of 21 microns had a mesh size of 12 mm.

EXAMPLES 2 AND 3

Electret films having a thickness of 13 microns as obtained from EXAMPLE 1 were split at a different fibrillation ratio of 5, 10 and 30, respectively, to form three kinds of network electret film-split fiber fleeces. The fleeces had a slit density of 400, 800 and 2400 slits, respectively, per square centimeter. Each fleece was wound on a bobbin.

In EXAMPLE 2, two kinds of fleeces obtained by employing the fibrillation ratios of 5 and 30 were rewound one upon the other about a bobbin, and cut transversely to form a laminate in which they lay alternately. The laminate was widened to form a web having a unit weight of 100 g/m².

In EXAMPLE 3, a laminate was formed by laying alternately one upon another 150 of each of the three kinds of fleeces, or a total of 450 fleeces, and was widened to form a web having a unit weight of 120 g/m².

The three kinds of fleeces formed by employing the fibrillation ratios of 5, 10 and 30 had a mesh size of 4, 9 and 37 mm, respectively, in the webs. The mesh size of each fleece as stated above or below is the average of 50 meshes taken at random through a stereomicroscope from the fleece removed from the corresponding sample filter after its evaluation as will hereinafter be explained.

A sample filter was cut out of each web by the Thomson's blade having a diameter of 75 mm.

COMPARATIVE EXAMPLE 1

Two kinds of network electret film-split fiber fleeces were prepared by repeating the process of EXAMPLE 1. They were cut to pieces having a length of 70 mm, and uniformly mixed to form staples. The staples were carded to form a web having a unit weight of 100 g/m² and a sample filter was cut out of the web by the Thomson's blade having a diameter of 75 mm.

Figure 2:
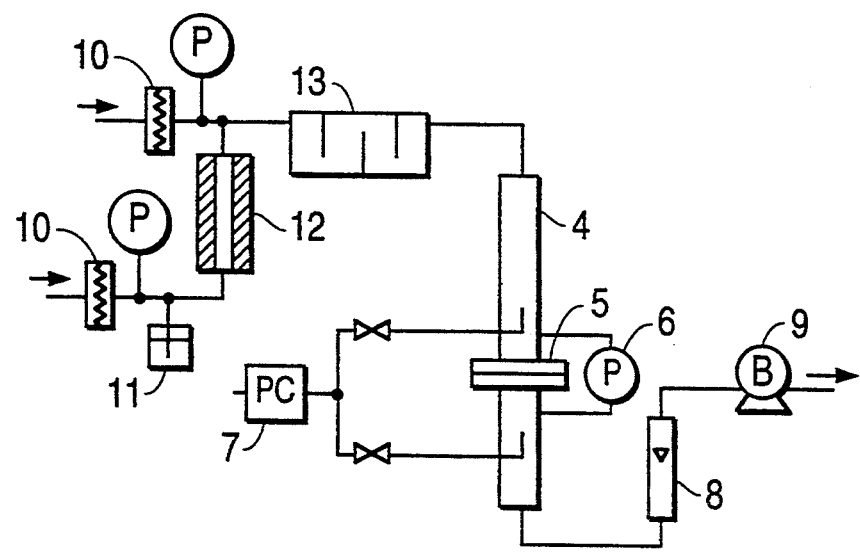
FIG. 2 is a diagram showing an apparatus for evaluating an electret filter.

The sample filters prepared in EXAMPLES 1 to 3 and COMPARATIVE EXAMPLE 1 were each evaluated for performance, i.e. the collecting efficiency for NaCl particles having a diameter of 0.3 micron and the pressure loss at a flow rate of 10 cm/sec. FIG. 2 shows the apparatus employed for the evaluation. It includes a duct 4, a sample holder 5, a differential pressure gauge 6, a particle counter 7, a flowmeter 8, a blower '9, a HEPA filter 10, a spray 11 for an aqueous solution of NaCl, a drier 12 and a concentration control box 13.

The results of the evaluation are shown in TABLE 1. The filter performance value was obtained by dividing by the value of pressure loss the natural logarithm obtained by dividing the value of (100—the value of collecting efficiency) by 100. A greater value indicates a better filter performance.

TABLE 1

| | Example 1 | Example 2 | Example 3 | Comparative Example 1 |
|---|---|---|---|---|
| Collection Efficiency (%) | 73 | 67 | 72 | 65 |
| Pressure Loss (mmAq) | 0.25 | 0.15 | 0.13 | 0.5 |
| Filter Performance Value | 5.2 | 7.4 | 9.8 | 2.1 |

As is obvious from TABLE 1, the filter of EXAMPLE 1 was more than twice as good in performance as that of COMPARATIVE EXAMPLE 1. The filters of EXAMPLES 2 and 3 were still better. The filter of EXAMPLE 3 was, among others, excellent, as it was not easily clogged with JIS #8 dust or pollen, but caused only a very slowly increasing pressure loss, thus exhibiting a long service life.

EXAMPLES 4 TO 9 AND COMPARATIVE EXAMPLES 2 TO 5

A cast film having a thickness of 30 microns was prepared by melt extrusion molding from a composition consisting mainly of isotactic polypropylene (TY-450 of Mitsui Toatsu, Japan) and containing 0.5% of aluminum stearate and 0.1% of pentaeruthrityl-tetrakis[3-(3.5-di-t-butyl-4-hydroxyphenyl)propionate]. The process of EXAMPLE 1 was repeated for making a uniaxially stretched film having a thickness of 10 microns and charging it. Then, the film was split at different ratios of fibrillation by employing four film splitters having different diameters, blade pitches and blade numbers, as shown in TABLE 2, whereby sample filters having different split widths of trunk and branch fibers and different packing densities were prepared as shown in TABLE 2. Each sample was evaluated by the apparatus shown in FIG. 2. The results are shown in TABLE 2. The split Width of the trunk or branch fibers is the average of the values which were measured of 50 trunk or branch fibers through a stereomicroscope after the fleece had been strongly pulled in the stretch direction of the film to restore its shape prior to widening. For any further detail or definition of the evaluation, mesh size, or filter performance value, reference is made to the relevant description which has been given in connection with EXAMPLES 1 to 3.

TABLE 2

| | Film Splitter Dia-Pitch-Number of Blades | Ratio of Fibrillation | Mesh Size (mm) | Weight (g/m²) | Packing Density (g/cc) | Split Width (μm) Trunk Fiber | Split Width (μm) Branch Fiber | Collection Efficiency (%) | Pressure Loss (mmAq) | Filter Performance Value |
|---|---|---|---|---|---|---|---|---|---|---|
| Example 4 | 30 mm-0.5 mm-4 | 5 | 3 | 198 | 0.02 | 450 | 132 | 93.1 | 0.22 | 12.2 |
| Example 5 | 30 mm-0.5 mm-4 | 10 | 10 | 185 | 0.02 | 315 | 105 | 95.3 | 0.26 | 11.8 |
| Example 6 | 30 mm-0.5 mm-4 | 20 | 24 | 174 | 0.03 | 268 | 93 | 92.0 | 0.25 | 10.1 |
| Comparative Example 2 | 30 mm-0.5 mm-4 | 50 | 70 | 110 | 0.04 | 203 | 71 | 85.5 | 0.50 | 4.6 |
| Comparative Example 3 | 10 mm-0.5 mm-2 | 5 | 0.8 | 231 | 0.06 | 478 | 246 | 89.2 | 0.70 | 3.2 |
| Example 7 | 10 mm-0.5 mm-2 | 10 | 4 | 275 | 0.02 | 217 | 64 | 98.8 | 0.25 | 17.7 |
| Comparative Example 4 | 30 mm-0.7 mm-4 | 2 | 5 | 254 | 0.06 | 1382 | 314 | 76.0 | 0.60 | 2.4 |
| Example 8 | 30 mm-0.7 mm-4 | 5 | 32 | 220 | 0.03 | 670 | 83 | 93.7 | 0.23 | 12.0 |
| Comparative Example 5 | 10 mm-0.7 mm-2 | 2 | 2 | 278 | 0.07 | 1418 | 690 | 75.0 | 0.60 | 2.3 |
| Example 9 | 10 mm-0.7 mm-2 | 8 | 12 | 215 | 0.02 | 582 | 96 | 97.4 | 0.24 | 15.0 |

As is obvious from TABLE 2, the products of EXAMPLES 4 to 9 with a packing density below 0.05 g/cc, and having trunk and branch fibers satisfying the conditions defining the scope of this invention were all very good in performance, as compared with the products of COMPARATIVE EXAMPLES 2 to 5.

EXAMPLE 10 AND COMPARATIVE EXAMPLE 6

The process of EXAMPLE 2 was repeated for making a filter having a unit weight of 50 g/m². It was reinforced with a plastic net carrying an active carbon powder stuck to it by an adhesive. The net was of monofilaments of polypropylene and polyethylene, had a mesh size of 5 mm and a unit weight of 80 g/m², and carried 40% of active carbon. Then, the whole was embossed to a degree of 1% to field a filter according to EXAMPLE 10.

A commercially available pleated electret filter element for an air conditioner was employed as COMPARATIVE EXAMPLE 6. It was formed from a web obtained by carding split fibers, and measured 75 mm wide by 280 mm long by mm thick. The filter had a unit weight of 80 g/m², while the split fibers had a unit weight of 20 g/m². The element included a reinforcing net having a unit weight of 50 g/m², and had a filter area of 0.05 m².

The filters of EXAMPLE 10 and COMPARATIVE EXAMPLE 6 were evaluated by employing the method employed in EXAMPLES 1 to 3, except that the flow rate of air flowing through the filter was increased to 1 m/sec. The results are shown in TABLE 3. Despite its flat construction, the filter of EXAMPLE 10 showed a higher collecting efficiency and a smaller pressure loss than the pleated filter of COMPARATIVE EXAMPLE 6, and was found suitable as a filter for an air conditioner.

TABLE 3

| | Collection Efficiency (%) | Pressure Loss (mmAq) |
| --- | --- | --- |
| Example 10 | 35 | 1.6 |
| Comparative Example 6 | 20 | 1.7 |

EXAMPLE 11

The process of EXAMPLE 3 was repeated for making network electret film-split fiber fleeces. Two fleeces were wound one upon the other about a bobbin so that their polarization surfaces might be of the same sign. The fleeces were transversely cut and widened to form a web having a unit weight of 180 g/m² as a filter. The results of its evaluation, as well as other data, are shown in TABLE 4. Its performance was outstanding.

TABLE 4

| | Mesh size (mm) | Packing density (g/cc) | Split width (μm) | | Collection Efficiency (%) | Pressure Loss (mmAq) | Filter Performance Value |
| --- | --- | --- | --- | --- | --- | --- | --- |
| | | | Trunk Fiber | Branch Fiber | | | |
| Example 11 | 24 | 0.02 | 268 | 93 | 99.0 | 0.25 | 18.4 |

What is claimed is:

1. A network electret film-split fiber fleece having a different mesh size defined by trunk and branch fibers.
2. An electret filter comprising a laminate of a plurality of fleeces as set forth in claim 1.
3. A fleece as set forth in claim 1, wherein said trunk fibers have a width of 10 to 1000 microns, while said branch fibers have a width of 1 to 500 microns, and said mesh size is from 1 to 50 mm.
4. An electret filter comprising a laminate of a plurality of fleeces as set forth in claim 3.
5. A filter as set forth in claim 2, wherein said laminate has a packing density of at most 0.05 g/cc.

* * * * *